United States Patent
Fujimoto et al.

(10) Patent No.: US 10,259,960 B2
(45) Date of Patent: Apr. 16, 2019

(54) AQUEOUS INK, INK CARTRIDGE, AND INK JET RECORDING METHOD

(71) Applicant: CANON KABUSHIKI KAISHA, Tokyo (JP)

(72) Inventors: Kuniaki Fujimoto, Chofu (JP); Masashi Tsujimura, Kawasaki (JP); Shuhei Takiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/279,631

(22) Filed: Sep. 29, 2016

(65) Prior Publication Data
US 2017/0107387 A1    Apr. 20, 2017

(30) Foreign Application Priority Data
Oct. 20, 2015    (JP) .................................. 2015-206407

(51) Int. Cl.
| | | |
|---|---|---|
| *B41J 2/01* | (2006.01) | |
| *C09D 11/324* | (2014.01) | |
| *C09D 11/037* | (2014.01) | |
| *C09D 11/102* | (2014.01) | |
| *C09D 11/38* | (2014.01) | |

(52) U.S. Cl.
CPC .............. *C09D 11/324* (2013.01); *B41J 2/01* (2013.01); *C09D 11/037* (2013.01); *C09D 11/102* (2013.01); *C09D 11/38* (2013.01)

(58) Field of Classification Search
None
See application file for complete search history.

(56) References Cited

U.S. PATENT DOCUMENTS

| | | |
|---|---|---|
| 5,554,739 A | 9/1996 | Belmont |
| 5,571,311 A | 11/1996 | Belmont et al. |
| 5,630,868 A | 5/1997 | Belmont et al. |
| 5,672,198 A | 9/1997 | Belmont |
| 5,713,988 A | 2/1998 | Belmont et al. |
| 5,851,280 A | 12/1998 | Belmont et al. |
| 5,900,029 A | 5/1999 | Belmont et al. |
| 6,042,643 A | 3/2000 | Belmont et al. |
| 6,123,759 A | 9/2000 | Mise et al. |
| 6,494,946 B1 | 12/2002 | Belmont et al. |
| 6,740,151 B2 | 5/2004 | Belmont et al. |

(Continued)

FOREIGN PATENT DOCUMENTS

| | | |
|---|---|---|
| JP | H08-003498 A | 1/1996 |
| JP | H10-212426 A | 8/1998 |

(Continued)

*Primary Examiner* — Erica S Lin
(74) *Attorney, Agent, or Firm* — Venable LLP

(57) ABSTRACT

An ink jet aqueous ink includes a pigment and a water-soluble organic solvent. The pigment includes a self-dispersible pigment having a carboxylic acid group directly bonded to a particle surface of carbon black having a DBP oil absorption of 120 mL/100 g or more to 150 mL/100 g or less, and has a surface charge amount of 0.20 mmol/g or more to 0.25 mmol/g or less, the water-soluble organic solvent contains a first water-soluble organic solvent having a relative dielectric constant of 28.0 or more at a temperature of 25° C., and a ratio of a content of the first water-soluble organic solvent to a total content of the water-soluble organic solvent is 50.0 mass % or more to 60.0 mass % or less.

16 Claims, 2 Drawing Sheets

(56) References Cited

U.S. PATENT DOCUMENTS

| | | | |
|---|---|---|---|
| 6,852,156 B2 | 2/2005 | Yeh et al. | |
| 6,929,362 B2 | 8/2005 | Takada et al. | |
| 6,932,465 B2 | 8/2005 | Nito et al. | |
| 6,935,732 B2 | 8/2005 | Takada et al. | |
| 7,276,110 B2 | 10/2007 | Tsujimura et al. | |
| 7,285,159 B2 | 10/2007 | Aikawa et al. | |
| 7,294,184 B2 | 11/2007 | Fujimoto et al. | |
| 7,294,185 B2 | 11/2007 | Belmont et al. | |
| 7,297,203 B2 | 11/2007 | Takada et al. | |
| 7,354,145 B2 | 4/2008 | Nito et al. | |
| 7,377,631 B2 | 5/2008 | Takada et al. | |
| 7,445,325 B2 | 11/2008 | Aikawa et al. | |
| 7,504,488 B2 | 3/2009 | Toyoda et al. | |
| 7,517,073 B2 | 4/2009 | Nito et al. | |
| 7,566,362 B2 | 7/2009 | Mori et al. | |
| 7,618,484 B2 | 11/2009 | Fujimoto et al. | |
| 7,705,071 B2 | 4/2010 | Nakagawa et al. | |
| 7,918,928 B2 | 4/2011 | Saito et al. | |
| 8,013,051 B2 | 9/2011 | Takada et al. | |
| 8,029,122 B2 | 10/2011 | Kojima et al. | |
| 8,389,600 B2 | 3/2013 | Suzuki et al. | |
| 8,469,504 B2 | 6/2013 | Saito et al. | |
| 8,814,341 B2 | 8/2014 | Nagao et al. | |
| 8,932,394 B2 | 1/2015 | Kudo et al. | |
| 8,986,435 B2 | 3/2015 | Saito et al. | |
| 8,992,674 B2 | 3/2015 | Ikegami et al. | |
| 9,090,789 B2 | 7/2015 | Hakamada et al. | |
| 2002/0014184 A1 | 2/2002 | Yeh et al. | |
| 2007/0146410 A1* | 6/2007 | Kawakami | B41J 2/2114 347/21 |
| 2010/0034972 A1 | 2/2010 | Mukae et al. | |
| 2012/0075369 A1* | 3/2012 | Anton | C09D 11/322 347/9 |
| 2014/0168314 A1* | 6/2014 | Moribe | B41J 2/2107 347/20 |
| 2015/0376428 A1* | 12/2015 | Sanada | C09D 11/324 347/20 |
| 2016/0280945 A1 | 9/2016 | Mukae et al. | |

FOREIGN PATENT DOCUMENTS

| | | |
|---|---|---|
| JP | H10-510862 A | 10/1998 |
| JP | 2003-535949 A | 12/2003 |
| JP | 2008-095088 A | 4/2008 |
| JP | 2010-254765 A | 11/2010 |
| JP | 2012-117020 A | 6/2012 |

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

An ink jet recording method allows images to be recorded on various recording media. In addition, in order to obtain a more satisfactory image, there have been proposed various inks in accordance with purposes, such as an ink suitable for recording an image of photographic quality on glossy paper or the like, and an ink suitable for recording a document on plain paper or the like.

In recent years, with use of plain paper or the like as a recording medium, the ink jet recording method has also been utilized for recording of, for example, a business document containing characters, diagrams, and the like, and frequency of its use in such application has been markedly increasing. In such application, it is important that an image having a black color tone, such as a character or a diagram, can be output with a high density, and an ink containing a self-dispersible pigment as a colorant is often utilized.

Various proposals concerning the self-dispersible pigment have heretofore been made. For example, there is a proposal of a modified pigment having a carboxylic acid group bonded via another atomic group to a particle surface of the pigment (Japanese Patent Application Laid-Open No. H10-510862). In addition, there are also proposals of various oxidized type self-dispersible pigments each having a carboxylic acid group directly bonded to a particle surface of the pigment (Japanese Patent Application Laid-Open No. 2003-535949, Japanese Patent Application Laid-Open No. 2012-117020, Japanese Patent Application Laid-Open No. H08-003498, and Japanese Patent Application Laid-Open No. 2010-254765).

SUMMARY OF THE INVENTION

The inventors of the present invention have made investigations, and as a result, have found that there is room for improvement in optical density of an image to be recorded with an ink containing the related-art self-dispersible pigment. When the aggregability of the self-dispersible pigment is enhanced, the optical density of the image to be recorded can be improved. However, when the aggregability of the self-dispersible pigment is enhanced, a problem with the reliability of the ink is liable to arise. For example, the self-dispersible pigment becomes liable to aggregate even in the ink, and hence the storage stability of the ink lowers. In addition, the viscosity of the ink becomes liable to increase through storage, and hence the sticking recovery property and intermittent ejection stability of the ink lower.

The sticking recovery property refers to a characteristic of eliminating clogging in an ejection orifice of a recording head caused by sticking of the ink, to thereby recover the recording head to a state in which the ink can be normally ejected. In addition, in recording of an image by an ink jet recording method, when a state in which a recovery operation of the recording head is not performed and the ink is not ejected from part of the ejection orifices of the recording head for a certain period of time continues, evaporation of moisture in the ink or the like from the part of the ejection orifices proceeds. After that, when an attempt is made to eject the ink from the part of the ejection orifices, ejection may be unstable or ejection may be impossible to perform, with the result that the image to be recorded is liable to have a defect. The intermittent ejection stability refers to a characteristic of preventing the ejection of the ink from becoming unstable or impossible even in the above-mentioned case, to thereby make the image to be recorded less liable to be disturbed. That is, the ink containing the related-art self-dispersible pigment has not been able to achieve both the optical density of the image to be recorded and the reliability of the ink at sufficiently high levels.

Therefore, the present invention is directed to providing an aqueous ink for ink jet (hereinafter, referred to as "ink jet aqueous ink") excellent in storage stability, sticking recovery property, and intermittent ejection stability, and capable of recording an image excellent in optical density. In addition, the present invention is also directed to proving an ink cartridge and an ink jet recording method each using the aqueous ink.

The above-mentioned objects are achieved by the present invention described below. That is, according to one aspect of the present invention, there is provided an ink jet aqueous ink, including: a pigment; and a water-soluble organic solvent, in which the pigment includes a self-dispersible pigment having a carboxylic acid group directly bonded to a particle surface of carbon black having a DBP oil absorption of 120 mL/100 g or more to 150 mL/100 g or less, and has a surface charge amount of 0.20 mmol/g or more to 0.25 mmol/g or less, in which the water-soluble organic solvent contains a first water-soluble organic solvent having a relative dielectric constant of 28.0 or more at a temperature of 25° C., and in which a ratio of a content of the first water-soluble organic solvent to a total content of the water-soluble organic solvent is 50.0 mass % or more to 60.0 mass % or less.

According to the present invention, the ink jet aqueous ink excellent in storage stability, sticking recovery property, and intermittent ejection stability, and capable of recording an image excellent in optical density can be provided. According to the present invention, the ink cartridge and the ink jet recording method each using the aqueous ink can also be provided.

Further features of the present invention will become apparent from the following description of exemplary embodiments with reference to the attached drawings.

BRIEF DESCRIPTION OF THE DRAWINGS

FIG. 2A is a perspective view of main parts of the ink jet recording apparatus, and FIG. 2B is a perspective view of a head cartridge.

DESCRIPTION OF THE EMBODIMENTS

Figure 1:
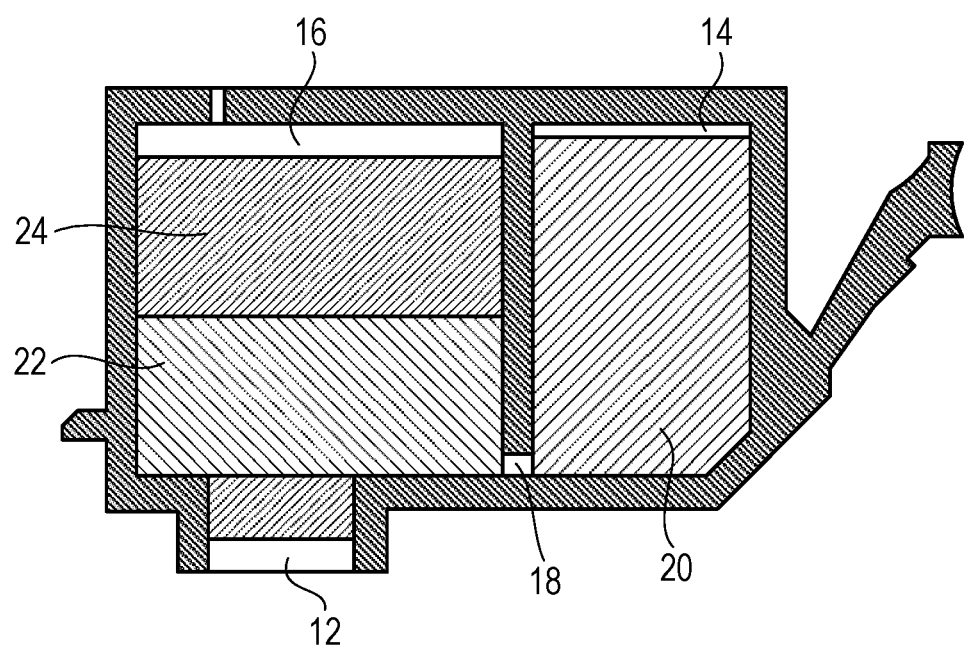
FIG. 1 is a cross-sectional view for schematically illustrating an ink cartridge according to one embodiment of the present invention.

Now, the present invention is described in more detail with reference to preferred embodiments. In the present invention, when a compound is a salt, the salt is present as dissociated ions in an ink, but the expression "contain a salt" is used for convenience. In addition, an ink jet aqueous ink is sometimes referred to simply as "ink". In addition, physical property values are values at normal temperature (25° C.), unless otherwise stated.

As described above, an ink containing a self-dispersible pigment as a colorant is widely utilized for recording of, for example, a business document containing characters, diagrams, and the like. The self-dispersible pigment disclosed in Japanese Patent Application Laid-Open No. H10-510862, which has a carboxylic acid group bonded via another atomic group, such as an aromatic ring, to the particle surface of the pigment, has increased aggregability when the density of functional groups bonded to the particle surfaces of the pigment (surface charge amount) is increased. Accordingly, when an ink containing such self-dispersible pigment is used, the optical density of an image to be recorded can be increased. However, the self-dispersible pigment becomes liable to aggregate even in the ink, and hence the storage stability of the ink becomes liable to lower. Further, it has been found that the viscosity of the ink after storage becomes liable to increase, and hence the sticking recovery property and the intermittent ejection stability tend to lower.

As a result of investigations, the inventors of the present invention have found that when a self-dispersible pigment having a carboxylic acid group directly bonded to the particle surface of carbon black is used as a colorant of an ink, both the optical density of the image and the reliability of the ink can be achieved at certain levels. However, the optical density of the image and the reliability of the ink have still not been considered to be at sufficient levels. As a result of further investigations, the inventors have found that the aggregability of the self-dispersible pigment needs to be suppressed to a low level in the ink, and be enhanced after application onto a recording medium. Then, the inventors have made investigations on a technology for controlling the aggregability of the self-dispersible pigment. As a result, the inventors of the present invention have found that it is appropriate to select, as the carbon black, carbon black exhibiting a predetermined DBP oil absorption, and to use a self-dispersible pigment having a predetermined surface charge amount and a specific water-soluble organic solvent exhibiting an affinity for the self-dispersible pigment at predetermined contents.

As the carbon black constituting the self-dispersible pigment, carbon black having a DBP oil absorption (mL/100 g) of 120 mL/100 g or more to 150 mL/100 g or less is used. When the DBP oil absorption is less than 120 mL/100 g or more than 150 mL/100 g, the optical density of the image becomes insufficient. In addition, it is necessary that the surface charge amount of the self-dispersible pigment is 0.20 mmol/g or more to 0.25 mmol/g or less. When the surface charge amount of the self-dispersible pigment is less than 0.20 mmol/g, the number of carboxylic acid groups is excessively small. Accordingly, the dispersion state of the pigment is liable to become unstable, and the storage stability of the ink becomes insufficient. Meanwhile, when the surface charge amount of the self-dispersible pigment is more than 0.25 mmol/g, the optical density of the image becomes insufficient.

In the case of a self-dispersible pigment having a carboxylic acid group bonded via another atomic group to the particle surface of the pigment, when the surface charge amount is high, the optical density of the image to be recorded increases. Meanwhile, in the case of a self-dispersible pigment having a carboxylic acid group directly bonded to the particle surface of the pigment, when the surface charge amount is excessively high, the optical density of the image to be recorded lowers contrarily. The inventors of the present invention presume as follows with regard to the reason why a relationship between the surface charge amount and the optical density varies depending on a difference in the manner of bonding of the carboxylic acid group to the particle surface of the pigment as described above. A water-soluble organic solvent having a high relative dielectric constant has an action of stably maintaining a dispersion state by solvating the particle surface of a self-dispersible pigment. When an aqueous ink containing the self-dispersible pigment is applied onto a recording medium, a liquid component, such as water, gradually evaporates. This allows molecules of the water-soluble organic solvent to easily approach the particle surface of the self-dispersible pigment. At this time, in the case of the self-dispersible pigment having a carboxylic acid group bonded via another atomic group to the particle surface of the pigment, as the surface charge amount increases, the solvation of the particle surface of the pigment with the water-soluble organic solvent is less liable to occur because of the steric hindrance of the other atomic group, such as an aromatic ring. Therefore, the action of suppressing aggregation of the pigment based on solvation tends to be difficult to exhibit. Meanwhile, in the case of the self-dispersible pigment having a carboxylic acid group directly bonded to the particle surface of the pigment, steric hindrance is small, and hence the solvation of the particle surface of the pigment with the water-soluble organic solvent occurs. Therefore, a dispersion state is stably maintained with ease, and the pigment is less liable to aggregate.

In order to verify the above-mentioned presumption, an ink (A) containing the self-dispersible pigment having a carboxylic acid group bonded via another atomic group to the particle surface of the pigment, and an ink (B) containing the self-dispersible pigment having a carboxylic acid group directly bonded to the particle surface of the pigment were prepared. Those inks had the same composition including the surface charge amount except for a difference in the manner of bonding of the carboxylic acid group to the particle surface of the pigment. The ink (A) and the ink (B) were each measured for its viscosity after having 50 mass % of its liquid component evaporated. As a result, it was revealed that the viscosity of the ink (A) was about 60 m·Pa/s, whereas the viscosity of the ink (B) was as low as about 8 m·Pa/s. This fact can be said to support the above-mentioned presumption.

The DBP oil absorption of the carbon black is an indicator of an assembly state of primary particles, and as its value increases, the carbon black has a bulkier structure having a larger amount of voids. As the DBP oil absorption increases, a pigment layer to be formed on a recording medium has a rougher surface. When the surface of the pigment layer is rough, diffuse reflection of light entering an image easily occurs, and the optical density of the image increases. However, in the case of the self-dispersible pigment having a carboxylic acid group directly bonded to the particle surface of the pigment, as the surface charge amount of the pigment increases, the ease with which the pigment aggregates reduces, and hence the optical density of the image tends to lower. Therefore, in the case of the self-dispersible pigment having a carboxylic acid group directly bonded to the particle surface of the pigment, as the DBP oil absorption increases, the optical density of the image also increases. However, the optical density of the image reaches a maximum at some point and does not increase any more even when the DBP oil absorption increases. For such reasons, in order to enhance the optical density of the image, carbon black having a DBP oil absorption within a certain range needs to be selected.

Also in the case of the self-dispersible pigment having a carboxylic acid group bonded via another atomic group to the particle surface of the pigment, as in the foregoing, as the DBP oil absorption increases, the optical density of the image increases. However, in the case of the self-dispersible pigment having a carboxylic acid group bonded via another atomic group to the particle surface of the pigment, the influence of the solvation described above is exhibited. Accordingly, when the surface charge amount of the pigment increases, the optical density of the image tends to increase also. Therefore, in the case of the self-dispersible pigment having a carboxylic acid group bonded via another atomic group to the particle surface of the pigment, no maximum of the optical density is present in the above-mentioned range of the DBP oil absorption.

Next, the water-soluble organic solvent is described. In the ink of the present invention, it is necessary that: the water-soluble organic solvent contain a first water-soluble organic solvent having a relative dielectric constant of 28.0 or more at a temperature of 25° C.; and the ratio of the content of the first water-soluble organic solvent to the total content of the water-soluble organic solvent is 50.0 mass % or more to 60.0 mass % or less. A water-soluble organic solvent having a low relative dielectric constant tends to enhance the aggregability of a self-dispersible pigment, and the tendency becomes remarkable in the case of the self-dispersible pigment having a carboxylic acid group directly bonded to the particle surface of the pigment, which hardly causes steric hindrance. Accordingly, when a large amount of a water-soluble organic solvent having an excessively low relative dielectric constant is used, the pigment is liable to aggregate even in the ink. Particularly in a narrow path like an ink flow path in a recording head, the pigment is liable to aggregate and stick, and hence sticking recovery property becomes insufficient. Meanwhile, in the case of the self-dispersible pigment having a carboxylic acid group bonded via another atomic group to the particle surface of the pigment, the action of the water-soluble organic solvent is difficult to exhibit because of steric hindrance. Accordingly, the pigment is less affected by the influence of the water-soluble organic solvent having a low relative dielectric constant as compared to the self-dispersible pigment having a carboxylic acid group directly bonded to the particle surface of the pigment.

The inventors of the present invention presume as follows with regard to the reason why it is necessary that the ratio of the content of the first water-soluble organic solvent to the total content of the water-soluble organic solvent is 50.0 mass % or more to 60.0 mass % or less. When the ratio is less than 50.0 mass %, the ratio of the water-soluble organic solvent having a low relative dielectric constant, which is liable to enhance the aggregability of the self-dispersible pigment, is excessively high. Accordingly, when moisture is evaporated from an ejection orifice of a nozzle of a recording head, the concentration of the water-soluble organic solvent having a low relative dielectric constant increases, and thus the pigment recedes from the ejection orifice to a deeper portion of the nozzle. Accordingly, at the portion to which the pigment has receded, the pigment is present in a large amount and is liable to aggregate and stick, and hence sticking recovery property becomes insufficient. Meanwhile, when the ratio is more than 60.0 mass %, the ratio of the water-soluble organic solvent having a high relative dielectric constant is excessively high. Accordingly, the pigment is less liable to recede. However, when moisture is evaporated from the ejection orifice, the viscosity of the ink present in the vicinity of the ejection orifice is liable to increase, and intermittent ejection stability becomes insufficient.

<Aqueous Ink>

The ink of the present invention is an ink jet aqueous ink containing a pigment and a water-soluble organic solvent. The pigment is a self-dispersible pigment having a carboxylic acid group directly bonded to the particle surface of carbon black having a DBP oil absorption of 120 mL/100 g or more to 150 mL/100 g or less, and has a surface charge amount of 0.20 mmol/g or more to 0.25 mmol/g or less. In addition, the water-soluble organic solvent contains a first water-soluble organic solvent having a relative dielectric constant of 28.0 or more at a temperature of 25° C. Now, constituent components of the ink of the present invention, physical properties of the ink, and the like are described in detail. The present invention is not limited by the following description without departing from the gist of the present invention.

(Pigment)

The pigment to be used for the ink of the present invention is a self-dispersible pigment having a carboxylic acid group directly bonded to the particle surface of carbon black having a DBP oil absorption (mL/100 g) of 120 mL/100 g or more to 150 mL/100 g or less. The self-dispersible pigment has a surface charge amount of 0.20 mmol/g or more to 0.25 mmol/g or less. The content (mass %) of the pigment in the ink is preferably 2.0 mass % or more to 5.0 mass % or less with reference to the total mass of the ink. When the content of the pigment is less than 2.0 mass %, the optical density of the image may slightly lower. Meanwhile, when the content of the pigment is more than 5.0 mass %, sticking recovery property may slightly lower.

The self-dispersible pigment having a carboxylic acid group directly bonded to the particle surface of the carbon black is produced by any of various methods. From the viewpoints of productivity and cost, it is preferred to use a self-dispersible pigment produced by an oxidization treatment method, such as a method involving subjecting carbon black to oxidization treatment with an oxidizing agent, such as a hydrogen peroxide solution or a hypochlorite, or a method involving subjecting carbon black to oxidization treatment with an ozone gas.

That the carboxylic acid group is directly bonded to the particle surface of the carbon black may be verified, for example, as described below. A pigment dispersion liquid containing the self-dispersible pigment is loaded into a hermetic container, and stored under a high-temperature environment for a certain period of time (e.g., at a temperature of 60° C. for 2 weeks). After that, centrifugal treatment is performed to precipitate the self-dispersible pigment, and the supernatant is isolated. The isolated supernatant is analyzed by ion chromatography. Similarly, the pigment dispersion liquid before storage is subjected to centrifugal treatment and the isolated supernatant is analyzed by ion chromatography. From the results of the analyses, it is verified whether or not low-molecular-weight organic carboxylic acids, such as formic acid, acetic acid, and oxalic acid, have increased through storage. Then, when the increase of the organic carboxylic acids is found, it can be determined that the carboxylic acid group is directly bonded to the particle surface of the carbon black.

Even when a pigment dispersion liquid containing the self-dispersible pigment having a carboxylic acid group bonded via another atomic group to the particle surface of the pigment is stored for a long period of time as described above, the low-molecular-weight organic carboxylic acids hardly increase. A possible reason for the occurrence of such difference is as described below.

The self-dispersible pigment having a carboxylic acid group bonded via another atomic group to the particle surface of the pigment is mainly produced by subjecting a diazonium salt of a compound corresponding to "another atomic group" substituted with a carboxylic acid group to a coupling reaction with the particle surface of a pigment. Meanwhile, the self-dispersible pigment having a carboxylic acid group directly bonded to the particle surface of the carbon black is often produced by oxidization treatment from the viewpoints of productivity and cost. The oxidizing agent attacks a single bond or a double bond between constituent carbon atoms of the carbon black to produce a carboxylic acid group while causing a bond-cleaving reaction, and hence low-carbon-number fragments eliminated from the particles of the carbon black are also produced. The produced fragments are oxidized by the oxidizing agent as well as the carbon black, and low-molecular-weight organic carboxylic acids are produced as side products. Such low-molecular-weight organic carboxylic acids are liberated through long-term storage and centrifugation, and detected in large amounts from the supernatant.

The self-dispersible pigment having a carboxylic acid group directly bonded to the particle surface of the carbon black is preferably produced by oxidization treatment with an ozone gas. When the self-dispersible pigment is produced by a method involving performing oxidization treatment with an oxidizing agent, such as a hydrogen peroxide solution or a hypochlorite, a side product, such as humic acid, is produced (see Japanese Patent Application Laid-Open No. H10-212426). The side product, such as humic acid, may affect ink jet characteristics. Meanwhile, the inventors of the present invention have verified as described below that the side product, such as humic acid, is less liable to be produced in oxidization treatment with an ozone gas. Specifically, the amount of humic acid in a pigment dispersion liquid containing 20.0 mass % of a self-dispersible pigment obtained by subjecting carbon black to oxidization treatment with an ozone gas in water was measured by the method disclosed in Japanese Patent Application Laid-Open No. 2008-095088. As a result, Abs values in the region of 230 nm to 260 nm were less than 0.1, and thus it was verified that hardly any humic acid was present.

The DBP oil absorption of the carbon black may be measured by a method in conformity with JIS K6221 or a method in conformity with ASTM D 2414. Those methods are each a method involving dropping dibutyl phthalate into 100 g of carbon black under stirring, and measuring the amount of dropped dibutyl phthalate at the time point when the maximum torque is achieved.

The surface charge amount may be utilized as an indicator of the amount of an ionic group of a self-dispersible pigment. The surface charge amount of the self-dispersible pigment may be measured by colloid titration. In Examples to be described later, the surface charge amount of a self-dispersible pigment in a pigment dispersion liquid was measured by colloid titration utilizing a potential difference with a potentiometric automatic titration apparatus (trade name: "AT-510", manufactured by Kyoto Electronics Manufacturing Co., Ltd.) including a streaming potential titration unit (PCD-500). More specifically, the pigment dispersion liquid was diluted about 300 times (mass basis) with pure water, and then as required, the pH was adjusted to about 10 with potassium hydroxide, followed by potentiometric titration using 5 mmol/L methyl glycol chitosan as a titration reagent. Of course, the surface charge amount may be measured using a pigment extracted from an ink by an appropriate method. The surface charge amount of the self-dispersible pigment is preferably 0.20 mmol/g or more to 0.24 mmol/g or less, more preferably 0.20 mmol/g or more to 0.22 mmol/g or less.

The counterion of the carboxylic acid group of the self-dispersible pigment contains preferably an alkali metal ion, more preferably a potassium ion. When the counterion of the carboxylic acid group is an ammonium ion, which is a monovalent cation as with the alkali metal ion, the viscosity of the ink after long-term storage is liable to increase, and the storage stability of the ink may slightly lower. Meanwhile, when the counterion of the carboxylic acid group is the alkali metal ion, such as the potassium ion, the storage stability of the ink can be more enhanced. The kind of the counterion of the carboxylic acid group of the self-dispersible pigment may be found out using an ion probe (e.g., trade name: "NH4-10Z", manufactured by Kasahara Chemical Instruments Corp.). The concentration of the alkali metal ion of potassium or the like in the ink is preferably 500 ppm or less on a mass basis. The concentration of the alkali metal ion in the ink may be measured by ICP emission spectrometry.

(First Water-Soluble Organic Solvent)

The ink of the present invention contains the water-soluble organic solvent. The water-soluble organic solvent contains the first water-soluble organic solvent having a relative dielectric constant of 28.0 or more. In addition, the ratio of the content of the first water-soluble organic solvent to the total content of the water-soluble organic solvent is 50.0 mass % or more to 60.0 mass % or less. In addition, the content (mass %) of the first water-soluble organic solvent in the ink is preferably 5.0 mass % or more to 25.0 mass % or less, more preferably 10.0 mass % or more to 15.0 mass % or less with reference to the total mass of the ink. In addition, the content (mass %) of the self-dispersible pigment is preferably 0.17 times or more to 0.36 times or less, more preferably 0.20 times or more to 0.30 times or less in terms of mass ratio to the content (mass %) of the first water-soluble organic solvent. When the mass ratio is less than 0.17 times, the action of suppressing aggregation of the pigment based on solvation with the first water-soluble organic solvent is liable to be exhibited, and hence the optical density of the image may slightly lower. Meanwhile, when the mass ratio is more than 0.36 times, the ratio of the first water-soluble organic solvent to the pigment is excessively low. Accordingly, the dispersion state of the pigment is liable to become unstable, and sticking recovery property may slightly lower.

The relative dielectric constant of the water-soluble organic solvent may be measured using a dielectric constant meter (e.g., trade name: "BI-870" (manufactured by Brookhaven Instruments Corporation)) at a frequency of 10 kHz. A value calculated from the following equation (1) based on the measurement of the relative dielectric constant of a 50 mass % aqueous solution is adopted as the relative dielectric constant of a water-soluble organic solvent that is a solid at a temperature of 25° C. The "water-soluble organic solvent" generally means a liquid, but in the present invention, a solvent that is a solid at 25° C. (normal temperature) is also encompassed in the water-soluble organic solvent.

$$\varepsilon_{sol} \times 2\varepsilon_{50\%} - \varepsilon_{water} \quad (1)$$

$\varepsilon_{sol}$: Relative dielectric constant of water-soluble organic solvent that is a solid at 25° C.

$\varepsilon_{50\%}$: Relative dielectric constant of 50 mass % aqueous solution of water-soluble organic solvent that is a solid at 25° C.

$\varepsilon_{water}$: Relative dielectric constant of water

As specific examples of a water-soluble organic solvent that is a solid at 25° C. and that is generally used for an aqueous ink, there may be given, for example, 1,6-hexanediol, trimethylolpropane, ethylene urea, urea, and a polyethylene glycol having a number-average molecular weight of 1,000.

The reason why the relative dielectric constant of the water-soluble organic solvent that is a solid at 25° C. is calculated from the relative dielectric constant of its 50 mass % aqueous solution is as described below. Some of the water-soluble organic solvents each of which is a solid at 25° C. and may serve as a constituent component of an aqueous ink are difficult to prepare into aqueous solutions having high concentrations of more than 50 mass %. Meanwhile, in an aqueous solution having a low concentration of 10 mass % or less, the relative dielectric constant of water is dominant, and hence it is difficult to obtain a probable (effective) value of the relative dielectric constant of the water-soluble organic solvent. In view of the foregoing, the inventors of the present invention have made investigations, and as a result, have found that most water-soluble organic solvents each of which is a solid at 25° C. and may be used for an ink can be prepared into aqueous solutions to be subjected to measurement, and relative dielectric constants to be calculated are compatible with the effects of the present invention. For the above-mentioned reason, in the present invention, the relative dielectric constant of the water-soluble organic solvent that is a solid at 25° C. calculated from the relative dielectric constant of its 50 mass % aqueous solution is used. Even in the case of a water-soluble organic solvent that is a solid at 25° C., when its solubility in water is so low that its 50 mass % aqueous solution cannot be prepared, a value of its relative dielectric constant calculated in conformity with the case of calculating the $\varepsilon_{sol}$ through the utilization of its aqueous solution having a saturated concentration is used for convenience.

Specific examples of the first water-soluble organic solvent may include urea (110.3), ethylene urea (49.7), dimethylsulfoxide (48.9), glycerin (42.3), γ-butyrolactone (41.9), ethylene glycol (40.4), 1-(2-hydroxyethyl)-2-pyrrolidone (37.6), trimethylolpropane (33.7), methanol (33.1), N-methyl-2-pyrrolidone (32.0), triethanolamine (31.9), diethylene glycol (31.7), 1,4-butanediol (31.1), 1,3-butanediol (30.0), 1,2-propanediol (28.8), 1,2,6-hexanetriol (28.5), 2-methyl-1,3-propanediol (28.3), and 2-pyrrolidone (28.0) (each of the numerical values in parentheses represents a relative dielectric constant at 25° C.). The relative dielectric constant of the first water-soluble organic solvent is preferably 120.0 or less. The vapor pressure of the first water-soluble organic solvent at 25° C. is preferably lower than that of water. In the present invention, as the first water-soluble organic solvents, ethylene urea, glycerin, trimethylolpropane, or 2-pyrrolidone is preferably used, and glycerin or 2-pyrrolidone is more preferably used. In particular, glycerin and 2-pyrrolidone are preferably used in combination.

(Aqueous Medium)

The ink of the present invention is preferably an aqueous ink containing an aqueous medium that is a mixed solvent of water and a water-soluble organic solvent. As the water, deionized water or ion-exchanged water is preferably used.

The content (mass %) of the water in the ink is preferably 50.0 mass % or more to 95.0 mass % or less with reference to the total mass of the ink.

The water-soluble organic solvent contains the first water-soluble organic solvent having a relative dielectric constant of 28.0 or more at a temperature of 25° C. As a water-soluble organic solvent except for the first water-soluble organic solvent, a water-soluble organic solvent having a relative dielectric constant of less than 28.0 at a temperature of 25° C. (hereinafter sometimes referred to as "second water-soluble organic solvent" for convenience) may be used in combination with the first water-soluble organic solvent. As the second water-soluble organic solvent, one kind or two or more kinds that may be used for inks for ink jet may be used. The content (mass %) of the water-soluble organic solvent (including the first water-soluble organic solvent) in the ink is preferably 1.0 mass % or more to 50.0 mass % or less, more preferably 20.0 mass % or more to 30.0 mass % or less with reference to the total mass of the ink. When the content of the water-soluble organic solvent is less than 1.0 mass %, sticking recovery property may lower, and when the content is less than 20.0 mass %, sticking recovery property may slightly lower. Meanwhile, when the content of the water-soluble organic solvent is more than 50.0 mass %, intermittent ejection stability may lower, and when the content is more than 30.0 mass %, intermittent ejection stability may slightly lower. In addition, the content (mass %) of the self-dispersible pigment is preferably 0.09 times or more to 0.19 times or less, more preferably 0.10 times or more to 0.15 times or less in terms of mass ratio to the content (mass %) of the water-soluble organic solvent. When the mass ratio is less than 0.09 times, the action of suppressing aggregation of the pigment based on solvation with the first water-soluble organic solvent is liable to occur, and hence the optical density of an image may slightly lower. Meanwhile, when the mass ratio is more than 0.19 times, the ratio of the water-soluble organic solvent to the pigment is excessively low. Accordingly, the dispersion state of the pigment is liable to become unstable, and sticking recovery property may slightly lower.

Specific examples of the water-soluble organic solvent (including the specific examples of the first water-soluble organic solvent) may include: monohydric alcohols each having 1 to 4 carbon atoms, such as methanol (33.1), ethanol (23.8), n-propanol, isopropanol (18.3), n-butanol, sec-butanol, and tert-butanol; dihydric alcohols, such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), 3-methyl-1,3-butanediol (24.0), 3-methyl-1,5-pentanediol (23.9), and 2-ethyl-1,3-hexanediol (18.5); polyhydric alcohols, such as 1,2,6-hexanetriol (28.5), glycerin (42.3), trimethylolpropane (33.7), and trimethylolethane; alkylene glycols, such as ethylene glycol (40.4), diethylene glycol (31.7), triethylene glycol (22.7), tetraethylene glycol, butylene glycol, hexylene glycol, and thiodiglycol; glycol ethers, such as diethylene glycol monomethyl ether, diethylene glycol monoethyl ether, triethylene glycol monoethyl ether, and triethylene glycol monobutyl ether (9.8); polyalkylene glycols each having a number-average molecular weight of 200 to 1,000, such as a polyethylene glycol having a number-average molecular weight of 200 (18.9), a polyethylene glycol having a number-average molecular weight of 600 (11.4), a polyethylene glycol having a number-average molecular weight of 1,000 (4.6), and polypropylene glycol; nitrogen-containing compounds, such as 2-pyrrolidone (28.0), N-methyl-2-pyrrolidone (32.0), 1-(2-hydroxyethyl)-

2-pyrrolidone (37.6), 1,3-dimethyl-2-imidazolidinone, N-methylmorpholine, urea (110.3), ethylene urea (49.7), triethanolamine (31.9), 1-hydroxymethyl-5,5-dimethylhydantoin (23.7), and 1,3-bis(2-hydroxyethyl)-5,5-dimethylhydantoin (16.0); sulfur-containing compounds, such as dimethylsulfoxide (48.9) and bis(2-hydroxyethylsulfone); and cyclic ethers, such as γ-butyrolactone (41.9) (each of the numerical values in parentheses represents a relative dielectric constant at 25° C.). The relative dielectric constant of the water-soluble organic solvent (except for the first water-soluble organic solvent) is preferably 3.0 or more. As the water-soluble organic solvent to be contained in the ink, it is preferred to use only a water-soluble organic solvent whose vapor pressure at 25° C. is lower than that of water.

(Other Component)

The ink of the present invention may contain various additives, such as a resin, a surfactant, an antifoam agent, a pH adjustor, an antiseptic, a fungicide, an antioxidant, and an anti-reduction agent, as required, in order to achieve desired physical property values. In general, the content of any such additive in the ink is very low, and its influence on the effects of the present invention is small. Accordingly, in the present invention, those additives are not included in the "water-soluble organic solvent", and are not subjected to the calculation of the relative dielectric constant. The resin (e.g., a water-soluble or water-dispersible polymer compound) may affect the optical density of an image, and hence its incorporation into the ink may be avoided.

(Physical Properties of Ink)

The ink of the present invention preferably has a surface tension of 38 mN/m or more to 42 mN/m or less at 25° C. When the surface tension of the ink is less than 38 mN/m, the ink is liable to permeate a recording medium, and hence the optical density of the image may slightly lower. Meanwhile, when the surface tension of the ink is more than 42 mN/m, blurring is liable to occur at a boundary between images recorded with the ink of the present invention (black ink) and a color ink, respectively, and thus bleeding resistance may slightly lower. The surface tension of the ink at 25° C. may be measured using a static surface tensiometer based on a plate method.

The ink of the present invention preferably has a viscosity of 2.1 mPa·s or more to 2.6 mPa·s or less at 25° C. When the viscosity of the ink is less than 2.1 mPa·s, the ink is liable to permeate a recording medium, and hence the optical density of the image may slightly lower. Meanwhile, when the viscosity of the ink is more than 2.6 mPa·s, intermittent ejection stability may slightly lower. The viscosity of the ink at 25° C. may be measured using a rotary viscometer.

<Ink Cartridge>

An ink cartridge of the present invention includes the ink and an ink storage portion storing the ink. In addition, the ink stored in the ink storage portion is the ink of the present invention described above. FIG. 1 is a cross-sectional view for schematically illustrating an ink cartridge according to one embodiment of the present invention. As illustrated in FIG. 1, an ink supply port 12 for supplying an ink to a recording head is arranged in the bottom surface of the ink cartridge. The inside of the ink cartridge serves as an ink storage portion for storing an ink. The ink storage portion includes an ink storage chamber 14 and an absorber storage chamber 16, which communicate with each other through a communicating port 18. In addition, the absorber storage chamber 16 communicates with the ink supply port 12. In the ink storage chamber 14, a liquid ink 20 is stored, and in the absorber storage chamber 16, absorbers 22 and 24 each configured to hold the ink in an impregnated state are stored.

The ink storage portion may be of a mode including no ink storage chamber configured to store the liquid ink and being configured to hold the whole amount of the ink to be stored in the absorbers. In addition, the ink storage portion may be of a mode including no absorber and being configured to store the whole amount of the ink in a liquid state. Further, the ink cartridge may be an ink cartridge of a mode including the ink storage portion and a recording head.

<Ink Jet Recording Method>

An ink jet recording method of the present invention is a method including ejecting the ink of the present invention described above from an ink jet recording head to record an image on a recording medium. As a system for the ejection of the ink, there are given a system involving applying mechanical energy to the ink, and a system involving applying thermal energy to the ink. In the present invention, it is particularly preferred to adopt a system involving applying thermal energy to the ink to eject the ink. Known steps may be adopted as the steps of the ink jet recording method except for the use of the ink of the present invention.

Figure 2A:
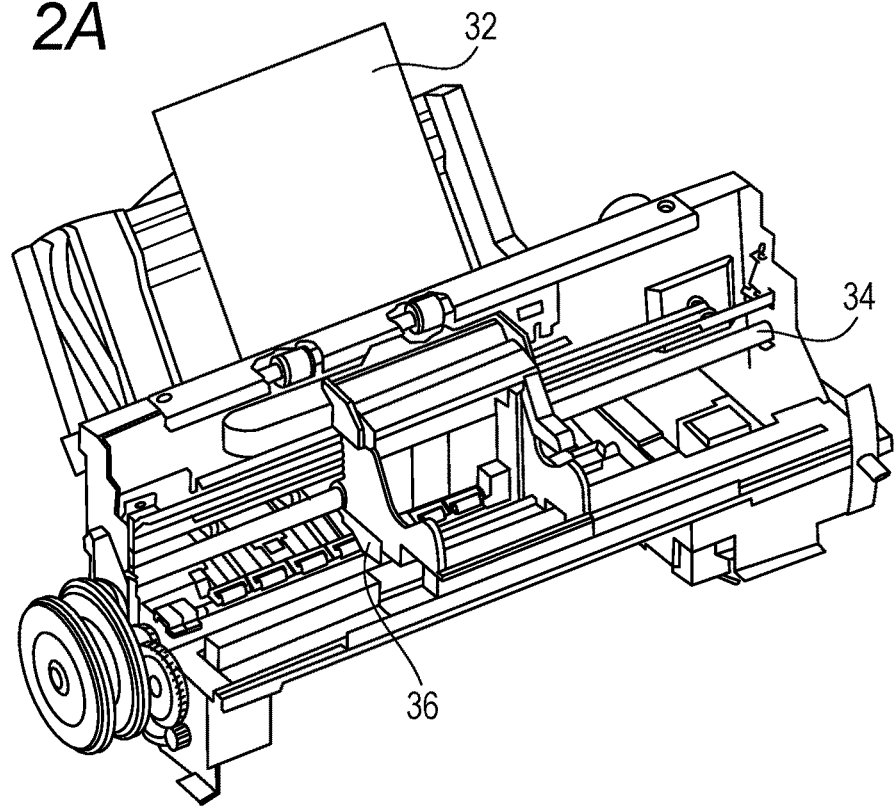
FIG. 2A and FIG. 2B are each a view for schematically illustrating an example of an ink jet recording apparatus to be used in an ink jet recording method of the present invention.
Figure 2B:
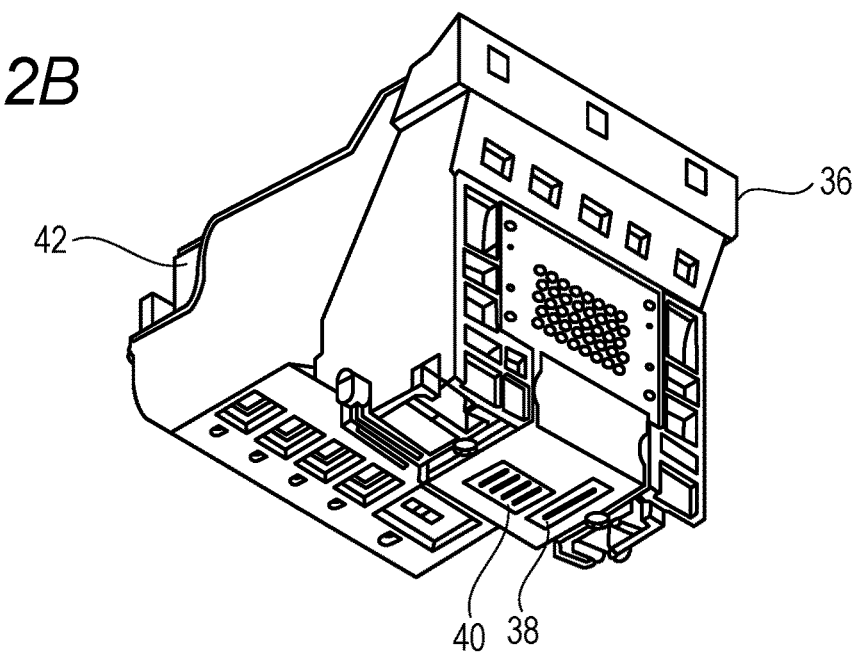

FIG. 2A and FIG. 2B are each a view for schematically illustrating an example of an ink jet recording apparatus to be used in the ink jet recording method of the present invention, FIG. 2A is a perspective view of main parts of the ink jet recording apparatus, and FIG. 2B is a perspective view of a head cartridge. The ink jet recording apparatus includes a conveying unit (not shown) configured to convey a recording medium 32, and a carriage shaft 34. A head cartridge 36 is mountable onto the carriage shaft 34. The head cartridge 36 includes recording heads 38 and 40, and is configured such that an ink cartridge 42 may be set to the head cartridge 36. While the head cartridge 36 is conveyed along the carriage shaft 34 in a main scanning direction, an ink (not shown) is ejected from each of the recording heads 38 and 40 toward the recording medium 32. In addition, the recording medium 32 is conveyed in a sub-scanning direction by the conveying unit (not shown), and thus an image is recorded on the recording medium 32.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass, unless otherwise stated.

<Preparation of Pigment Dispersion Liquid> (Pigment Dispersion Liquids 1 to 10)

300.0 g of a pigment (carbon black) shown in Table 1 and 2,000.0 g of pure water were loaded into a simple autoclave made of glass (trade name: "TEM-U1000N", manufactured by Taiatsu Techno Corporation), and the mixture was stirred. An ozone gas generated using an ozone generator (trade name: "KQS-120", manufactured by Kotohira) was adjusted to a flow rate shown in Table 1 and introduced into the autoclave, and the pigment was subjected to ozone oxidization treatment under stirring for 10 hours to provide a dispersion liquid. The pH of the resultant dispersion liquid was adjusted to 8 to 9 using a pH adjustor shown in Table 1, and then the resultant was ultrafiltered to prepare each pigment dispersion liquid having a content of a self-dispersible pigment of 10.0%. The surface charge amount of the self-dispersible pigment in each pigment dispersion liquid, and the potassium concentration or ammonia concentration of the pigment dispersion liquid are shown in Table 1.

The surface charge amount of the self-dispersible pigment in the pigment dispersion liquid (surface charge amount derived from a carboxylic acid group) was measured by the following method. That is, the measurement was performed by potentiometric titration using 5 mmol/L methyl glycol chitosan as a titration reagent with a potentiometric automatic titration apparatus (trade name: "AT-510", manufactured by Kyoto Electronics Manufacturing Co., Ltd.) including a streaming potential titration unit (PCD-500).

The potassium concentration and ammonia concentration of the pigment dispersion liquid were determined by the following method. For a pigment dispersion liquid containing a self-dispersible pigment prepared using potassium hydroxide as a pH adjustor, the potassium concentration was determined from the quantitative value of a potassium atom measured using an ICP emission spectrometer. In addition, for a pigment dispersion liquid containing a self-dispersible pigment prepared using ammonia as a pH adjustor, the ammonia concentration was determined through conversion from an ammonium ion concentration measured using an ion probe. For the self-dispersible pigment in the pigment dispersion liquid, it was verified by the following method that a carboxylic acid group was directly bonded to the particle surface of the pigment. The pigment dispersion liquid was loaded into a hermetic container, and stored at 60° C. for 2 weeks. After the storage, centrifugation was performed at a number of rotations of 80,000 rpm for 10 hours, and the supernatant was isolated. The isolated supernatant was analyzed by ion chromatography, and as a result, a large amount of oxalic acid was detected as compared to the case of using the pigment dispersion liquid before storage. From the above-mentioned result, it was determined that a carboxylic acid group was directly bonded to the particle surface of the pigment.

TABLE 1

Production Conditions and Characteristics of Self-dispersible Pigment and Pigment Dispersion Liquid

| | Production conditions | | | Characteristics | | |
|---|---|---|---|---|---|---|
| Pigment dispersion liquid | DBP oil absorption of carbon black (mL/100 g) | Ozone gas flow rate (g/hour) | pH adjustor | Surface charge amount (mmol/g) | Potassium concentration (ppm) | Ammonium concentration (ppm) |
| 1 | 140 | 13.2 | Potassium hydroxide | 0.22 | 881 | — |
| 2 | 120 | 12.9 | Potassium hydroxide | 0.22 | 879 | — |
| 3 | 150 | 13.1 | Potassium hydroxide | 0.22 | 875 | — |
| 4 | 140 | 12.0 | Potassium hydroxide | 0.20 | 803 | — |
| 5 | 140 | 15.0 | Potassium hydroxide | 0.25 | 1,008 | — |
| 6 | 140 | 12.0 | Ammonia | 0.22 | — | 405 |
| 7 | 106 | 13.0 | Potassium hydroxide | 0.22 | 869 | — |
| 8 | 160 | 13.2 | Potassium hydroxide | 0.22 | 439 | 199 |
| 9 | 140 | 11.4 | Potassium hydroxide | 0.19 | 762 | — |
| 10 | 140 | 15.6 | Potassium hydroxide | 0.26 | 1,043 | — |

(Pigment Dispersion Liquid 11)

In conformity with the disclosure of "Example 4" of Japanese Patent Application Laid-Open No. H10-510862, a pigment (carbon black, DBP oil absorption: 120 mL/100 g) was subjected to chemical modification treatment with 0.60 g of anthranilic acid (treatment agent) to provide a dispersion liquid. The pH of the resultant dispersion liquid was adjusted to 8 to 9 using potassium hydroxide, and then the resultant was ultrafiltered to prepare a pigment dispersion liquid 11 having a content of a self-dispersible pigment of 10.0%. The self-dispersible pigment in the pigment dispersion liquid 11 was a self-dispersible pigment having a carboxylic acid group bonded via a benzene ring to the particle surface of the pigment. The counterion of the carboxylic acid group was a potassium ion, and the surface charge amount was 0.20 mmol/g.

(Pigment Dispersion Liquid 12)

A pigment dispersion liquid 12 having a content of a self-dispersible pigment of 10.0% was prepared by the same procedure as that for the pigment dispersion liquid 11 except that the use amount of anthranilic acid (treatment agent) was changed to 0.77 g. The self-dispersible pigment in the pigment dispersion liquid 12 was a self-dispersible pigment having a carboxylic acid group bonded via a benzene ring to the particle surface of the pigment. The counterion of the carboxylic acid group was a potassium ion, and the surface charge amount was 0.25 mmol/g.

(Pigment Dispersion Liquid 13)

A pigment dispersion liquid 13 having a content of a self-dispersible pigment of 10.0% was prepared by the same procedure as that for the pigment dispersion liquid 11 except that the use amount of anthranilic acid (treatment agent) was changed to 0.79 g. The self-dispersible pigment in the pigment dispersion liquid 13 was a self-dispersible pigment having a carboxylic acid group bonded via a benzene ring to the particle surface of the pigment. The counterion of the carboxylic acid group was a potassium ion, and the surface charge amount was 0.26 mmol/g.

(Pigment Dispersion Liquid 14)

In conformity with the disclosure of "Example 3" of Japanese Patent Application Laid-Open No. 2003-535949, a pigment (carbon black, DBP oil absorption: 140 mL/100 g) was subjected to oxidization treatment with hydrogen peroxide to provide a dispersion liquid. The resultant dispersion liquid was ultrafiltered to prepare a pigment dispersion liquid 14 having a content of a self-dispersible pigment of 10.5%. The self-dispersible pigment in the pigment dispersion liquid 14 was a self-dispersible pigment having a carboxylic acid group directly bonded to the particle surface of the pigment. The counterion of the carboxylic acid group was a potassium ion, and the surface charge amount was 0.22 mmol/g.

(Pigment Dispersion Liquid 15)

In conformity with the disclosure of "Example 1" of Japanese Patent Application Laid-Open No. 2012-117020, a pigment (carbon black, DBP oil absorption: 105 mL/100 g) was subjected to oxidization treatment with ozone water to provide a dispersion liquid. The resultant dispersion liquid was ultrafiltered to prepare a pigment dispersion liquid 15 having a content of a self-dispersible pigment of 6.0%. The self-dispersible pigment in the pigment dispersion liquid 15 was a self-dispersible pigment having a carboxylic acid group directly bonded to the particle surface of the pigment. The counterion of the carboxylic acid group was a potassium ion, and the surface charge amount was 0.19 mmol/g.

(Pigment Dispersion Liquid 16)

In conformity with the disclosure of "Example 1" of Japanese Patent Application Laid-Open No. H08-003498, a pigment (carbon black, DBP oil absorption: 100 mL/100 g) was subjected to oxidization treatment with sodium hypochlorite to provide a dispersion liquid. The resultant dispersion liquid was ultrafiltered to prepare a pigment dispersion liquid 16 having a content of a self-dispersible pigment of 10.0%. The self-dispersible pigment in the pigment dispersion liquid 16 was a self-dispersible pigment having a carboxylic acid group directly bonded to the particle surface of the pigment. The counterion of the carboxylic acid group was a sodium ion, and the surface charge amount was 0.25 mmol/g.

(Pigment Dispersion Liquid 17)

In conformity with the disclosure of "Example 3" of Japanese Patent Application Laid-Open No. 2010-254765, a pigment (carbon black, trade name: "Printex 80", DBP oil absorption: 100 mL/100 g) was subjected to oxidization treatment with sodium hypochlorite to provide a dispersion liquid. The resultant dispersion liquid was ultrafiltered to prepare a pigment dispersion liquid 17 having a content of a self-dispersible pigment of 6.0%. The self-dispersible pigment in the pigment dispersion liquid 17 was a self-dispersible pigment having a carboxylic acid group directly bonded to the particle surface of the pigment. The counterion of the carboxylic acid group was a sodium ion, and the surface charge amount was 0.20 mmol/g.

<Preparation of Ink>

Components (unit: %) shown in the middle rows of Tables 2-1 to 2-5 were mixed and sufficiently stirred, and then subjected to pressure filtration through a microfilter having a pore size of 3.0 μm (manufactured by Fujifilm Corporation) to prepare each ink. A numerical value given to polyethylene glycol represents a number-average molecular weight. In Tables 2-1 to 2-5, "Acetylenol E100" is a trade name of an ethylene oxide adduct of acetylene glycol manufactured by Kawaken Fine Chemicals Co., Ltd. In addition, "Liponic EG-1" is a trade name of an ethylene oxide adduct of glycerin manufactured by Lipo Chemicals. In the lower rows of Tables 2-1 to 2-5, characteristics of the inks described below are shown.

[Characteristics of Ink]
Content A of first water-soluble organic solvent (%)
Total content B of water-soluble organic solvent (%)
Value of (A/B)×100(%)
Content P of self-dispersible pigment (%)
Value of P/A (times)
Value of P/B (times)
Surface tension of ink (mN/m)
Viscosity of ink (mPa·s)

The surface tension of each ink was measured at a temperature of 25° C. by a plate method using a static surface tensiometer (trade name: "automatic surface tensiometer DY-300", manufactured by Kyowa Interface Science Co., Ltd.). In addition, the viscosity of the ink was measured at a temperature of 25° C. using a rotary viscometer (trade name: "RE-80L", manufactured by Toki Sangyo Co., Ltd.).

TABLE 2

Compositions and Characteristics of Ink

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Kind of pigment dispersion liquid | 1 | 1 | 1 | 1 | 1 | 1 | 1 | 1 | 2 | 3 | 4 | 5 | 1 | 1 | 1 |
| Pigment dispersion liquid | 30.0 | 30.0 | 30.0 | 30.0 | 30.0 | 30.0 | 30.0 | 30.0 | 30.0 | 30.0 | 30.0 | 30.0 | 30.0 | 30.0 | 30.0 |
| Ethylene urea (49.7) | 7.0 | 11.0 | | | | | | | | | | | | | |
| Glycerin (42.3) | | | | | | | | | | | | | | | 6.0 |
| Trimethylol propane (33.7) | | | 11.0 | | 7.0 | 7.0 | 7.0 | 7.0 | | 7.0 | 7.0 | 7.0 | | 6.0 | |
| N-Methylpyrrolidone (32.0) | | | | 11.0 | | | | | | | | | | | |
| 2-Pyrrolidone (28.0) | 5.0 | | | | 5.0 | 5.0 | 5.0 | 5.0 | 5.0 | 5.0 | 5.0 | 5.0 | 11.0 | 4.5 | 7.0 |
| 1,5-Pentanediol (27.0) | | | | | 10.0 | | | | | | | | | | |
| 3-Methyl-1,5-pentanediol (23.9) | | | | 10.0 | | 10.0 | | | | | | | | | |
| Triethylene glycol (22.7) | 10.0 | 10.0 | 10.0 | | | | | | 10.0 | 10.0 | 10.0 | 10.0 | 10.0 | 10.5 | 8.7 |
| Ethanol (23.8) | | | | | | | | | | | | | | | |
| Polyethylene glycol 200 (18.9) | | | | | | | | | | | | | | | |
| Isopropanol (18.3) | | | | | | | | | | | | | | | |
| n-Propanol (12.0) | | | | | | | 10.0 | | | | | | | | |
| Polyethylene glycol 600 (11.4) | | | | | | | | 10.0 | | | | | | | |
| 1,6-Hexanediol (7.1) | | | | | | | | | | | | | | | |
| Polyethylene glycol 1000 (4.6) | | | | | | | | | | | | | | | |
| Acetylenol E100 | 0.2 | 0.2 | 0.2 | 0.2 | 0.2 | 0.2 | 0.1 | 0.1 | 0.2 | 0.2 | 0.2 | 0.2 | 0.2 | 0.2 | 0.2 |
| Liponic EG-1 | | | | | | | | | | | | | | | |
| Pure water | 47.8 | 48.8 | 48.8 | 48.8 | 47.8 | 47.8 | 47.9 | 47.9 | 47.8 | 47.8 | 47.8 | 47.8 | 48.8 | 48.8 | 48.1 |
| Content A of first water-soluble organic solvent (%) | 12.0 | 11.0 | 11.0 | 11.0 | 12.0 | 12.0 | 12.0 | 12.0 | 12.0 | 12.0 | 12.0 | 12.0 | 11.0 | 10.5 | 13.0 |
| Total content B of water-soluble organic solvent (%) | 22.0 | 21.0 | 21.0 | 21.0 | 22.0 | 22.0 | 22.0 | 22.0 | 22.0 | 22.0 | 22.0 | 22.0 | 21.0 | 21.0 | 21.7 |
| Value of (A/B) * 100 (%) | 54.5 | 52.4 | 52.4 | 52.4 | 54.5 | 54.5 | 54.5 | 54.5 | 54.5 | 54.5 | 54.5 | 54.5 | 52.4 | 50.0 | 59.9 |
| Content P of self dispersible pigment (%) | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Value of P/A (times) | 0.25 | 0.27 | 0.27 | 0.27 | 0.25 | 0.25 | 0.25 | 0.25 | 0.25 | 0.25 | 0.25 | 0.25 | 0.27 | 0.29 | 0.23 |
| Value of P/B (times) | 0.14 | 0.14 | 0.14 | 0.14 | 0.14 | 0.14 | 0.14 | 0.14 | 0.14 | 0.14 | 0.14 | 0.14 | 0.14 | 0.14 | 0.14 |
| Surface tension (mN/m) | 40 | 40 | 40 | 40 | 40 | 40 | 40 | 40 | 40 | 40 | 40 | 40 | 40 | 40 | 40 |
| Viscosity (mPa·s) | 2.3 | 2.4 | 2.3 | 2.3 | 2.3 | 2.3 | 2.3 | 2.3 | 2.3 | 2.3 | 2.3 | 2.3 | 2.3 | 2.2 | 2.3 |

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Kind of pigment dispersion liquid | 1 | 1 | 1 | 1 | 1 | 1 | 1 | 1 | 1 | 1 | 1 | 1 | 6 | 6 | 6 |
| Pigment dispersion liquid | 19.0 | 20.0 | 50.0 | 60.0 | 30.0 | 30.0 | 30.0 | 30.0 | 30.0 | 30.0 | 30.0 | 30.0 | 30.0 | 19.0 | 60.0 |
| Ethylene urea (49.7) | 7.0 | 7.0 | 8.0 | 8.0 | 7.0 | 7.0 | 7.0 | 7.0 | 5.0 | 7.0 | 9.5 | 10.0 | 7.0 | 5.0 | 10.0 |
| Glycerin (42.3) | | | | | | | | | | | | | | | |
| Trimethylol propane (33.7) | 5.0 | 5.0 | 6.0 | 6.0 | 7.0 | 10.0 | 10.0 | 10.0 | 5.0 | 4.0 | 7.5 | 9.0 | 5.0 | 5.0 | 9.0 |
| N-Methylpyrrolidone (32.0) | | | | | | | | | | | | | | | |
| 2-Pyrrolidone (28.0) | 11.0 | 10.0 | 12.0 | 13.0 | 10.0 | 10.0 | 10.0 | 10.0 | 9.0 | 9.0 | 13.0 | 16.0 | 10.0 | 9.0 | 16.0 |
| 1,5-Pentanediol (27.0) | | | | | | | | | | | | | | | |
| 3-Methyl-1,5-pentanediol (23.9) | | | | | | | | | | | | | | | |
| Triethylene glycol (22.7) | | | | | | | | | | | | | | | |
| Ethanol (23.8) | | | | | | | | | | | | | | | |
| Polyethylene glycol 200 (18.9) | | | | | | | | | | | | | | | |

TABLE 2-continued

Compositions and Characteristics of Ink

| | | | | | | | | | | | | | | | | |
|---|---|---|---|---|---|---|---|---|---|---|---|---|---|---|---|---|
| Isopropanol (18.3) | | | | | | | | | | | | | | | | |
| n-Propanol (12.0) | | | | | | | | | | | | | | | | |
| Polyethylene glycol 600 (11.4) | | | | | | | | | | | | | | | | |
| 1,6-Hexanediol (7.1) | | | | | | | | | | | | | | | | |
| Polyethylene glycol 1000 (4.6) | | | | | | | | | | | | | | | | |
| Acetylenol E100 | 0.2 | 0.2 | 0.2 | 0.2 | 0.3 | 0.26 | 0.1 | 0.08 | 0.2 | 0.2 | 0.2 | 0.2 | 0.2 | 0.3 | | | 0.08 |
| Liponic EG-1 | | | | | | | | | | | | | | | | |
| Pure water | 57.8 | 57.8 | 23.8 | 12.8 | 47.7 | 47.74 | 47.9 | 47.92 | 50.8 | 49.8 | 39.8 | 34.8 | 47.8 | 61.7 | | 4.92 |
| Content A of first water-soluble organic solvent (%) | 12.0 | 12.0 | 14.0 | 14.0 | 12.0 | 12.0 | 12.0 | 12.0 | 10.0 | 11.0 | 17.0 | 19.0 | 12.0 | 10.0 | | 19.0 |
| Total content B of water-soluble organic solvent (%) | 23.0 | 22.0 | 26.0 | 27.0 | 22.0 | 22.0 | 22.0 | 22.0 | 19.0 | 20.0 | 30.0 | 35.0 | 22.0 | 19.0 | | 35.0 |
| Value of (A/B) * 100 (%) | 52.2 | 54.5 | 53.8 | 51.9 | 54.5 | 54.5 | 54.5 | 54.5 | 52.6 | 55.0 | 56.7 | 54.3 | 54.5 | 52.6 | | 54.3 |
| Content P of self-dispersible pigment (%) | 1.9 | 2.0 | 5.0 | 6.0 | 3.0 | 3.0 | 3.0 | 3.0 | 3.0 | 3.0 | 3.0 | 3.0 | 3.0 | 1.9 | | 6.0 |
| Value of P/A (times) | 0.16 | 0.17 | 0.36 | 0.43 | 0.25 | 0.25 | 0.25 | 0.25 | 0.30 | 0.27 | 0.18 | 0.16 | 0.25 | 0.19 | | 0.32 |
| Value of P/B (times) | 0.08 | 0.09 | 0.19 | 0.22 | 0.14 | 0.14 | 0.14 | 0.14 | 0.16 | 0.15 | 0.10 | 0.09 | 0.14 | 0.10 | | 0.17 |
| Surface tension (mN/m) | 40 | 40 | 40 | 40 | 37 | 38 | 42 | 43 | 40 | 40 | 40 | 40 | 40 | 37 | | 43 |
| Viscosity (mPa · s) | 2.1 | 2.3 | 2.5 | 2.5 | 2.4 | 2.4 | 2.2 | 2.2 | 2.0 | 2.1 | 2.6 | 2.7 | 2.3 | 2.0 | | 2.7 |

| | Comparative Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Kind of pigment dispersion liquid | 7 | 8 | 9 | 10 | 1 | 1 | 1 | 11 | 12 | 13 | 12 | 12 | 14 | 15 | 16 | | |
| Pigment dispersion liquid | 30.0 | 30.0 | 30.0 | 30.0 | 30.0 | 30.0 | 30.0 | 30.0 | 30.0 | 30.0 | 30.0 | 30.0 | 31.25 | 67.0 | 50.0 | | 50.0 |
| Ethylene urea (49.7) | | | | | | | | | | | | | | | | | |
| Glycerin (42.3) | 7.0 | 7.0 | 7.0 | 7.0 | | 5.0 | 6.0 | 7.0 | 7.0 | 7.0 | 6.0 | | | 5.0 | | | 5.0 |
| Trimethylolpropane (33.7) | | | | | | | | | | | | | | | | | |
| N-Methylpyrrolidone (32.0) | | | | | | | | | | | | | | 9.0 | | | |
| 2-Pyrrolidone (28.0) | 5.0 | 5.0 | 5.0 | 5.0 | | 4.0 | 7.0 | 5.0 | 5.0 | 5.0 | 4.5 | 11.0 | | | 5.0 | | |
| 1,5-Pentanediol (27.0) | | | | | 11.0 | | | | | | | | | | | | |
| 3-Methyl-1,5-pentanediol (23.9) | | | | | | | | | | | | | | | | | |
| Triethylene glycol (22.7) | 10.0 | 10.0 | 10.0 | 10.0 | 10.0 | 12.0 | 8.0 | 10.0 | 10.0 | 10.0 | 10.5 | 10.0 | | 5.0 | 5.0 | | |
| Ethanol (23.8) | | | | | | | | | | | | | | | | | |
| Polyethylene glycol 200 (18.9) | | | | | | | | | | | | | 2.0 | | | | |
| Isopropanol (18.3) | | | | | | | | | | | | | 0.2 | | | | |
| n-Propanol (12.0) | | | | | | | | | | | | | | | | | |
| Polyethylene glycol 600 (11.4) | | | | | | | | | | | | | | | | | |
| 1,6-Hexanediol (7.1) | | | | | | | | | | | | | | | | | |
| Polyethylene glycol 1000 (4.6) | | | | | | | | | | | | | | | | | |
| Acetylenol E100 | 0.2 | 0.2 | 0.2 | 0.2 | 0.2 | 0.2 | 0.2 | 0.2 | 0.2 | 0.2 | 0.2 | 0.2 | 5.0 | 1.0 | | 5.0 | |
| Liponic EG-1 | | | | | | | | | | | | | | | | 1.0 | |
| Pure water | 47.8 | 47.8 | 47.8 | 47.8 | 48.8 | 48.8 | 48.8 | 47.8 | 47.8 | 47.8 | 48.8 | 48.8 | 52.55 | 22.0 | 40.0 | 39.0 | |
| Content A of first water-soluble organic solvent (%) | 12.0 | 12.0 | 12.0 | 12.0 | 0.0 | 9.0 | 13.0 | 12.0 | 12.0 | 12.0 | 10.5 | 0.0 | 9.0 | 5.0 | 5.0 | 5.0 | |
| Total content B of water-soluble organic solvent (%) | 22.0 | 22.0 | 22.0 | 22.0 | 21.0 | 21.0 | 21.0 | 22.0 | 22.0 | 22.0 | 21.0 | 21.0 | 11.2 | 10.0 | 10.0 | 10.0 | |
| Value of (A/B) * 100 (%) | 54.5 | 54.5 | 54.5 | 54.5 | 0.0 | 42.9 | 61.9 | 54.5 | 54.5 | 54.5 | 50.0 | 0.0 | 80.4 | 50.0 | 50.0 | 50.0 | |
| Content P of self-dispersible pigment (%) | 3.0 | 3.0 | 3.0 | 3.0 | 3.0 | 3.0 | 3.0 | 3.0 | 3.0 | 3.0 | 3.0 | 3.0 | 3.3 | 6.7 | 5.0 | 3.0 | |
| Value of P/A (times) | 0.25 | 0.25 | 0.25 | 0.25 | — | 0.33 | 0.23 | 0.25 | 0.25 | 0.25 | 0.29 | — | 0.37 | 0.80 | 1.00 | 0.60 | |
| Value of P/B (times) | 0.14 | 0.14 | 0.14 | 0.14 | 0.14 | 0.14 | 0.14 | 0.14 | 0.14 | 0.14 | 0.14 | 0.14 | 0.29 | 0.40 | 0.50 | 0.30 | |
| Surface tension (mN/m) | 40 | 40 | 40 | 40 | 40 | 40 | 40 | 40 | 40 | 40 | 40 | 40 | 50 | 32 | 50 | 32 | |
| Viscosity (mPa · s) | 2.3 | 2.3 | 2.3 | 2.3 | 2.4 | 2.2 | 2.3 | 2.3 | 2.3 | 2.3 | 2.2 | 2.4 | 2.6 | 1.7 | 1.7 | 1.7 | |

<Evaluation>

The prepared inks were each used to perform the evaluation of each item described below. An ink jet recording apparatus used for the evaluation is an ink jet recording apparatus (trade name: "PIXUS iP2700", manufactured by Canon Inc.) including a recording head configured to eject an ink by thermal energy. In Examples of the present invention, the recording duty of a solid image recorded under the conditions of applying one ink droplet having a mass per droplet of 25 ng±10% onto a unit region of 1/600 inch×1/600 inch was defined as 100%. In the present invention, in the evaluation criteria described below, the levels "A" and "B" were defined as acceptable levels, and the level "C" was defined as an unacceptable level. The evaluation results are shown in Table 3.

(Optical Density)

An ink cartridge was loaded with an ink, and set in an ink jet recording apparatus. Then, a solid image (2 cm×2 cm/1 line) having a recording duty of 100% was recorded on each of three sheets of a recording medium (plain paper, trade name: "Canon Extra", manufactured by Canon Inc.). After a lapse of 1 day from the recording, the optical density of the solid image was measured using a reflection densitometer (trade name: "Macbeth RD-918", manufactured by Gretag-Macbeth), and the optical density of the image was evaluated from the average value of the optical densities in the three sheets of the recording medium in accordance with the following evaluation criteria.

A: The average value of the optical densities was 1.30 or more.
B: The average value of the optical densities was 1.28 or more to less than 1.30.
C: The average value of the optical densities was less than 1.28.

(Bleeding Resistance)

An ink cartridge was loaded with an ink, and set in an ink jet recording apparatus. A cartridge for a color ink for the ink jet recording apparatus (trade name: "FINE Cartridge BC-311—3 colors," manufactured by Canon Inc.) was also set in the ink jet recording apparatus. For the color ink, the recording duty of an image recorded under the conditions of applying two ink droplets having a mass per droplet of 5.5 ng±10% onto a unit region of 1/600 inch×1/600 inch was defined as 100%. An image having the following pattern was recorded on a recording medium (plain paper, trade name: "PB PAPER", manufactured by Canon Inc.). That is, a solid image (2 cm×2 cm) having a recording duty of each ink (black ink) of 100%, and a solid image (2 cm×2 cm) having a recording duty of a yellow ink of 70% adjacent to both sides of the above-mentioned solid image were recorded. A boundary portion between the solid images of the two colors was visually observed, and bleeding resistance was evaluated in accordance with the following evaluation criteria.

A: Bleeding did not occur, or occurred to a slight degree.
B: Bleeding occurred, but the boundary was able to be recognized.
C: Bleeding occurred to such a degree that the boundary between the solid images of the two colors was unrecognizable.

(Storage Stability)

150 g of an ink was loaded into a hermetic container, and stored in a thermostatic chamber at a temperature of 70° C. for 2 months. After the ink was cooled, the viscosity of the ink at a temperature of 25° C. (viscosity after storage) was measured using a rotary viscometer (trade name: "RE-80L", manufactured by Toki Sangyo Co., Ltd.). Then, the change ratio of the viscosity as compared to the viscosity of the ink before storage (immediately after production) (viscosity before storage) was calculated from the following equation, and storage stability was evaluated in accordance with the following evaluation criteria. Change ratio of viscosity (times)="Viscosity after storage"/"Viscosity before storage"

A: The change ratio of the viscosity was 1.05 times or less.
B: The change ratio of the viscosity was more than 1.05 times to 1.10 times or less.
C: The change ratio of the viscosity was more than 1.10.

(Sticking Recovery Property)

An ink cartridge was loaded with an ink, and set in an ink jet recording apparatus. The ink jet recording apparatus was placed in an environment having a temperature of 30° C. and a relative humidity of 10% for 14 days. After that, a nozzle check pattern was recorded on a recording medium (plain paper, trade name: "PB PAPER", manufactured by Canon Inc.). The recorded nozzle check pattern was visually observed. For an ink with which recording was unable to be normally performed, a recovery operation (preliminary ejection and wiping) was performed until recording was able to be normally performed. Sticking recovery property was evaluated from the number of times of the recovery operation until recording was able to be normally performed in accordance with the following evaluation criteria.

A: The nozzle check pattern was able to be normally recorded without the recovery operation or after the recovery operation had been performed once.
B: The nozzle check pattern was able to be normally recorded after the recovery operation had been performed twice.
C: The recovery operation needed to be performed 3 or more times until the nozzle check pattern was able to be normally recorded.

(Intermittent Ejection Stability)

An ink cartridge was loaded with an ink, and set in an ink jet recording apparatus. The ink jet recording apparatus was placed in an environment having a temperature of 30° C. and a relative humidity of 10% for 1 day. After that, one droplet of the ink was ejected from each of all the ejection orifices constituting a nozzle array of a recording head to record a vertical ruled line on a recording medium (plain paper, trade name: "PB PAPER", manufactured by Canon Inc.). The recorded vertical ruled line was observed visually or with a loupe, and intermittent ejection stability was evaluated in accordance with the following evaluation criteria.

A: The ruled line had a slight defect when observed with a loupe, but the ruled line had no visually observable defect.
B: The ruled line had a visually observable defect.
C: The ruled line had a defect even when visually observed, and the degree of the defect was such that the ruled line was unable to be recognized as a ruled line.

TABLE 3

| | | Evaluation Results | | | | |
|---|---|---|---|---|---|---|
| | | Optical density | Bleeding resistance | Storage stability | Sticking recovery property | Intermittent ejection stability |
| Example | 1 | A | A | A | A | A |
| | 2 | A | A | A | A | A |
| | 3 | A | A | A | A | A |
| | 4 | A | A | A | A | A |
| | 5 | A | A | A | A | A |
| | 6 | A | A | A | A | A |
| | 7 | A | A | A | A | A |
| | 8 | A | A | A | A | A |
| | 9 | A | A | A | A | A |

TABLE 3-continued

Evaluation Results

|  |  | Optical density | Bleeding resistance | Storage stability | Sticking recovery property | Intermittent ejection stability |
|---|---|---|---|---|---|---|
|  | 10 | A | A | A | A | A |
|  | 11 | A | A | A | A | A |
|  | 12 | A | A | A | A | A |
|  | 13 | A | A | A | A | A |
|  | 14 | A | A | A | A | A |
|  | 15 | A | A | A | A | A |
|  | 16 | B | A | A | A | A |
|  | 17 | A | A | A | A | A |
|  | 18 | A | A | A | A | A |
|  | 19 | A | A | A | B | A |
|  | 20 | B | A | A | A | A |
|  | 21 | A | A | A | A | A |
|  | 22 | A | A | A | A | A |
|  | 23 | A | B | A | A | A |
|  | 24 | B | A | A | B | A |
|  | 25 | A | A | A | A | A |
|  | 26 | A | A | A | A | A |
|  | 27 | B | A | A | A | B |
|  | 28 | A | A | B | A | A |
|  | 29 | B | A | B | B | B |
|  | 30 | A | B | B | B | B |
| Comparative Example | 1 | C | A | A | A | A |
|  | 2 | C | A | A | A | A |
|  | 3 | A | A | C | A | A |
|  | 4 | C | A | A | A | A |
|  | 5 | A | A | C | C | A |
|  | 6 | A | A | A | C | A |
|  | 7 | A | A | A | A | C |
|  | 8 | B | A | C | B | C |
|  | 9 | B | A | C | B | C |
|  | 10 | A | A | C | B | C |
|  | 11 | B | A | C | B | C |
|  | 12 | B | A | C | B | C |
|  | 13 | A | C | A | C | C |
|  | 14 | C | A | C | C | A |
|  | 15 | C | B | C | C | A |
|  | 16 | C | B | C | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-206407, filed Oct. 20, 2015, which is hereby incorporated by reference herein in its entirety.

What is claimed is:

1. An ink jet aqueous ink, comprising:
   (a) a pigment; and
   (b) a water-soluble organic solvent,
   wherein the pigment comprises a self-dispersible pigment having (i) a carboxylic acid group directly bonded to a particle surface of carbon black, (ii) a DBP oil absorption of 120 mL/100 g or more to 150 mL/100 g or less, and (iii) a charge amount of the carboxylic acid group of 0.20 mmol/g or more to 0.25 mmol/g or less,
   wherein the water-soluble organic solvent comprises a first water-soluble organic solvent having a relative dielectric constant of 28.0 or more at a temperature of 25° C., and
   wherein a ratio of a content of the first water-soluble organic solvent to a total content of the water-soluble organic solvent is 50.0 mass % or more to 60.0 mass % or less.

2. The aqueous ink according to claim 1, wherein a content (mass %) of the pigment is 2.0 mass % or more to 5.0 mass % or less with reference to a total mass of the ink.

3. The aqueous ink according to claim 1, wherein a content (mass %) of the self-dispersible pigment is 0.17 times or more to 0.36 times or less in terms of mass ratio to a content (mass %) of the first water-soluble organic solvent.

4. The aqueous ink according to claim 1, wherein a content (mass %) of the self-dispersible pigment is 0.09 times or more to 0.19 times or less in terms of mass ratio to a content (mass %) of the water-soluble organic solvent.

5. The aqueous ink according to claim 1, which has a surface tension of 38 mN/m or more to 42 mN/m or less.

6. The aqueous ink according to claim 1, which has a viscosity of 2.1 mPa·s or more to 2.6 mPa·s or less.

7. The aqueous ink according to claim 1, wherein a counterion of the carboxylic acid group comprises a potassium ion.

8. An ink cartridge, comprising:
   an ink; and
   an ink storage portion storing the ink,
   wherein the ink comprises the aqueous ink according to claim 1.

9. An ink jet recording method, comprising ejecting an ink from an ink jet recording head to record an image on a recording medium,
   wherein the ink comprises the aqueous ink according to claim 1.

10. The aqueous ink according to claim 1, wherein the charge amount of the carboxylic acid group of the self-dispersible pigment is 0.20 mmol/g or more to 0.24 mmol/g or less.

11. The aqueous ink according to claim 3, wherein the content (mass %) of the self-dispersible pigment is 0.20 times or more to 0.30 times or less in terms of mass ratio to the content (mass %) of the first water-soluble organic solvent.

12. The aqueous ink according to claim 1, wherein the first water-soluble organic solvent comprises at least one selected from the group consisting of ethylene urea, glycerin, trimethylolpropane, and 2-pyrrolidone.

13. The aqueous ink according to claim 12, wherein the first water-soluble organic solvent comprises at least one selected from the group consisting of glycerin and 2-pyrrolidone.

14. The aqueous ink according to claim 1, wherein the content (mass %) of the water-soluble organic solvent is 20.0 mass % or more to 30.0 mass % or less with reference to the total mass of the ink.

15. The aqueous ink according to claim 1, wherein the content (mass %) of the first water-soluble organic solvent is 10.0 mass % or more to 15.0 mass % or less with reference to the total mass of the ink.

16. The aqueous ink according to claim 1, wherein the water-soluble organic solvent, except for the first water-soluble organic solvent, comprises at least one selected from the group consisting of 3-methyl-1,5-pentanediol, triethylene glycol, polyethylene glycol having a number-average molecular weight of 200, polyethylene glycol having a number-average molecular weight of 600, and 1,6-hexanediol.

* * * * *